Oct. 25, 1955	F. G. MITCHELL	2,721,521
WAGON TRAVERSER

Filed Aug. 14, 1951	6 Sheets-Sheet 1

INVENTOR
F. G. Mitchell
By Watson, Cole, Grindle & Watson

Oct. 25, 1955   F. G. MITCHELL   2,721,521
WAGON TRAVERSER

Filed Aug. 14, 1951   6 Sheets-Sheet 2

INVENTOR
F. G. Mitchell

By Watson, Cole, Grindle & Watson

Oct. 25, 1955   F. G. MITCHELL   2,721,521
WAGON TRAVERSER

Filed Aug. 14, 1951   6 Sheets-Sheet 3

INVENTOR
F. G. Mitchell
By Watson, Cole, Grindle + Watson

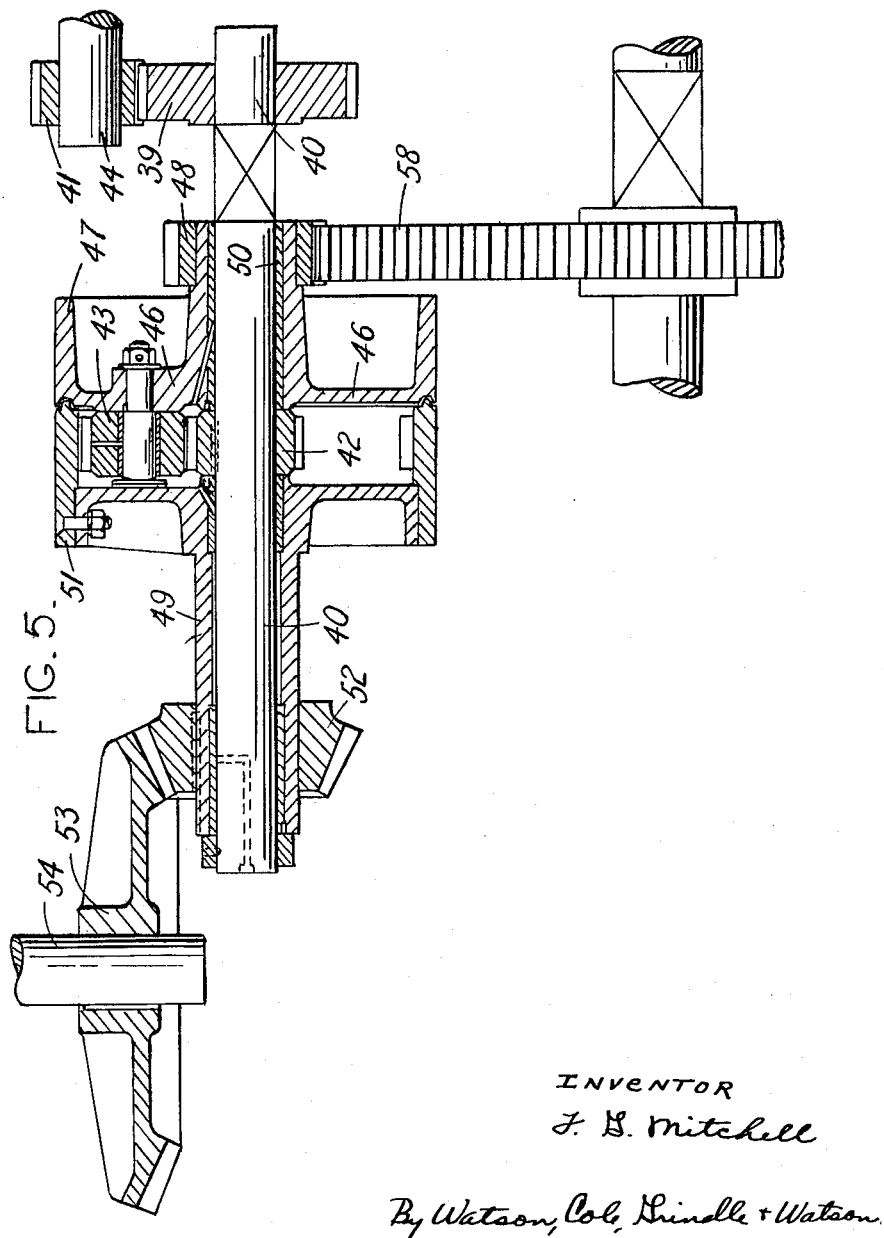

Oct. 25, 1955  F. G. MITCHELL  2,721,521
WAGON TRAVERSER
Filed Aug. 14, 1951  6 Sheets-Sheet 5
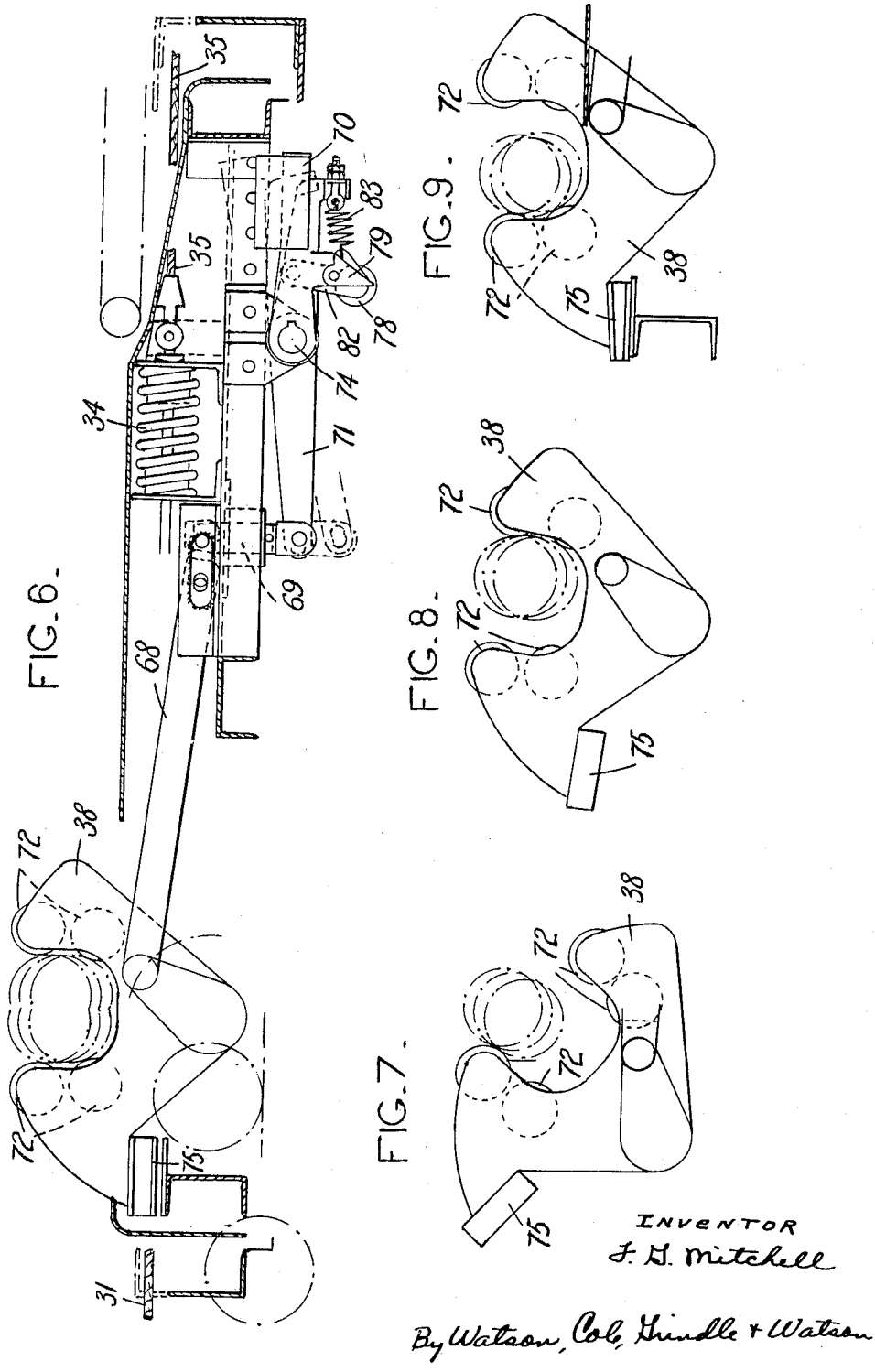
INVENTOR
F. G. Mitchell
By Watson, Cole, Grindle & Watson

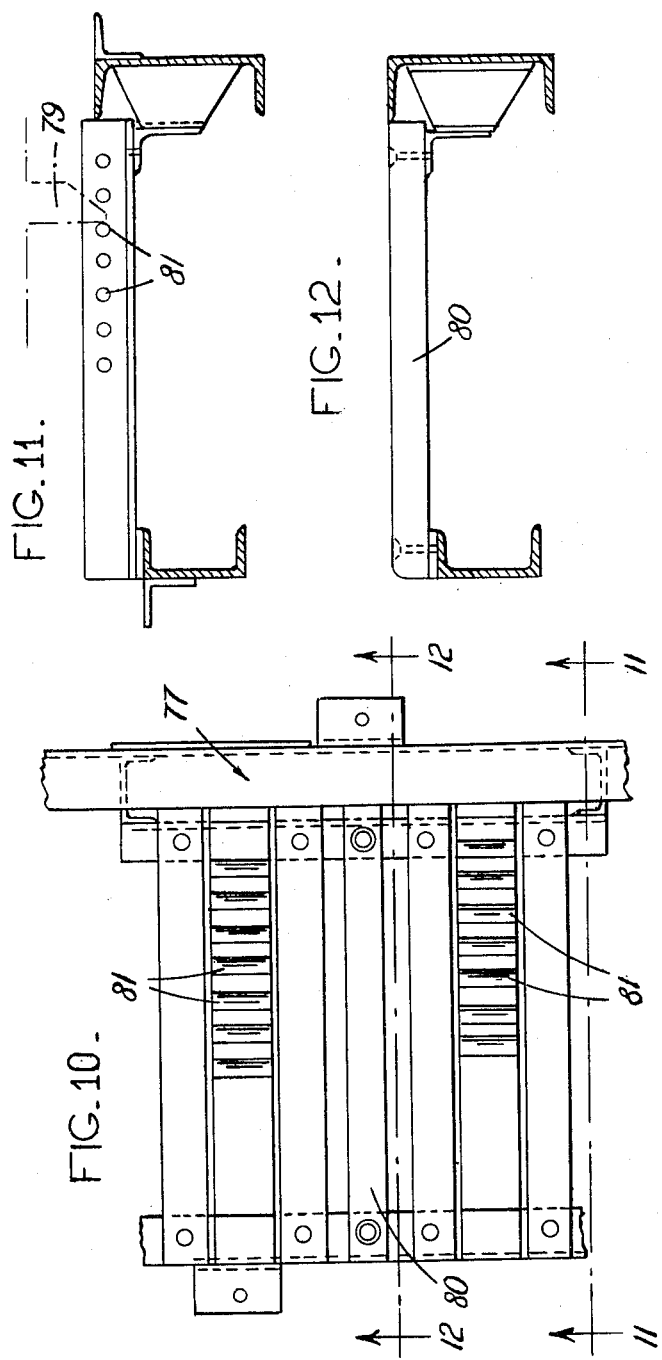

United States Patent Office 2,721,521
Patented Oct. 25, 1955

2,721,521

WAGON TRAVERSER

Frederick Gilbert Mitchell, London, England

Application August 14, 1951, Serial No. 241,771

Claims priority, application Great Britain August 17, 1950

6 Claims. (Cl. 104—48)

This invention relates to wagon traversers.

Proposals have been made (e. g. in British Patent No. 628,500, dated April 19, 1948) for using a traverser in railway-wagon marshalling yards, to reduce the large area occupied by separate reception and marshalling sidings. Wagon traversers are arranged for movement transversely to a set of parallel sidings and in use, are aligned with one of the sidings, receive a wagon from that siding, are moved transversely to the sidings with the wagon, i. e. perform a traversing operation and then are aligned with another of the sidings in order to allow the wagon to be discharged to that siding. For practical reasons it is desirable that the width of the traverser (i. e. the overall dimension of the traverser measured at right angles to the direction of the traversing movement) should be as short as possible, e. g. just sufficient to accommodate a single wagon. It is an object of the present invention to provide an improved traverser having a limited width and with which traverser, the handling of wagons is mainly automatic.

According to the invention a railway-wagon traverser comprises a carriage traversable in a track arranged transversely of a set of substantially parallel railway sidings, a travelling mechanism locatable wholly within the width of the carriage and movable therein for movement relatively thereto in a direction parallel with the sidings, the said mechanism comprising two or more components movable bodily in the direction aforesaid and relatively to one another in the same direction, whereby to one component an effective travel greater than the width of the carriage may be imparted, and associated with the latter component catch means for engaging the wagon to be moved.

In the preferred form of the invention the travelling mechanism comprises two or more trolleys assembled in surmounted relationship for movement as aforesaid. In a practical embodiment of this preferred form the traverser comprises a carriage traversable in a track arranged transversely of a set of substantially parallel railway sidings, a main trolley mounted upon the carriage to partake of its traversing movement as aforesaid and also arranged to be movable relatively of the carriage in a direction parallel with the sidings between a position in which the main trolley is wholly upon the carriage and a position in which part of the main trolley extends beyond one or other side of the carriage on to the sidings, a secondary trolley mounted upon the main trolley and movable between opposite ends thereof in a direction parallel with the sidings, wagon axle engaging catch on the secondary trolley arranged to engage with a forward part of the wagon to be handled and means by which the carriage and its associated trolleys may respectively be driven during the handling operation, whereof the essential steps comprise moving the trolleys to extend partially over the siding on which the wagon to be handled is situated, while simultaneously the secondary trolley is moved outwardly (i. e. towards the sidings) from one end to the other of the main trolley into a position for the wagon axle engaging catch to engage the wagon, returning the main trolley on to the carriage while simultaneously the secondary trolley is moved inwardly to the opposite end of the main trolley taking the wagon with it, traversing the carriage into a position in which the trolleys are in alignment with another siding, on to which the wagon is to be transferred, moving the trolleys to extend over the said other siding, and providing for disengagement of the wagon axle engaging catch from the wagon.

The secondary trolley may be so arranged as to move automatically from one to the other end of the main trolley, in the direction of motion thereof, while the main trolley moves relatively of the carriage, in a direction parallel with the sidings, from a position in which the main trolley is wholly upon the carriage to a position in which the main trolley partly extends on to a siding.

The carriage and main trolley may be driven from an electric motor or other suitable means by an epicyclic gear train arranged to provide either the traversing motion of the carriage or the longitudinal motion of the main trolley. The traversing motion of the carriage and the longitudinal motion of the trolley may be provided by separate electric motors or other suitable means.

The wagon axle engaging catch may comprise a plate having a forked or re-entrant profile, which plate is mounted on the secondary trolley for rotation in a vertical plane parallel to the direction of movement of the secondary trolley relative to the main trolley and is so arranged that an axle of a wagon to be moved may enter the forked or re-entrant portion of the profile of the plate and then, upon movement of the secondary trolley over the main trolley, automatically rotate the plate to a position in which the forked or re-entrant portion is held upright, thereby holding the axle of the wagon, by a locking mechanism during the handling operation.

The wagon axle engaging catch may be released, in order to discharge the wagon to a siding, by a pawl or pawls, operatively connected to the locking mechanism, engaging a ratchet grid located at the traverser end of the siding to which the wagon is to be discharged.

As an example of the invention a particular construction of a traverser will now be described with reference to the accompanying drawings, in which:—

Figure 5 is a sectional plan view of the driving mechanism for the traverser;

Figure 6 is a side view of the wagon-axle engaging catch and associated mechanism;

Figures 7, 8 and 9 show three positions of the wagon axle engaging catch during the operation of the traverser in handling a wagon;

Figure 10 is a plan view of a tripper shown at the right-hand side of Figure 1;

Figure 11 is a sectional view on the line 11—11 in Figure 10; and

Figure 12 is a sectional view on the line 12—12 in Figure 10.

Figure 1:
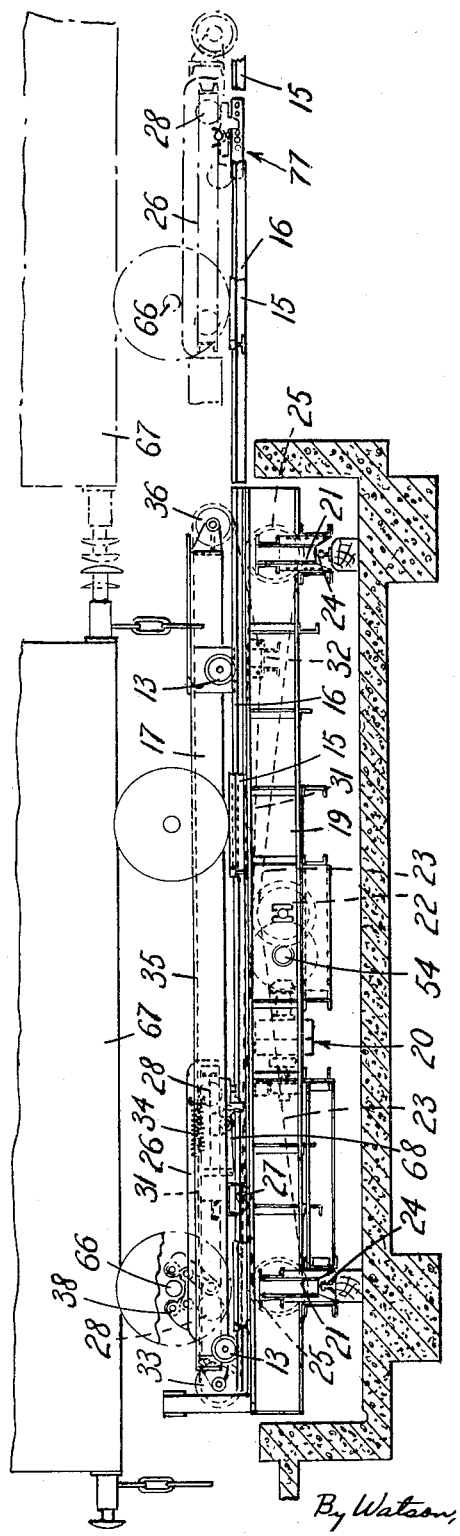
Figure 1 is a side elevation of the traverser.
Figure 2:
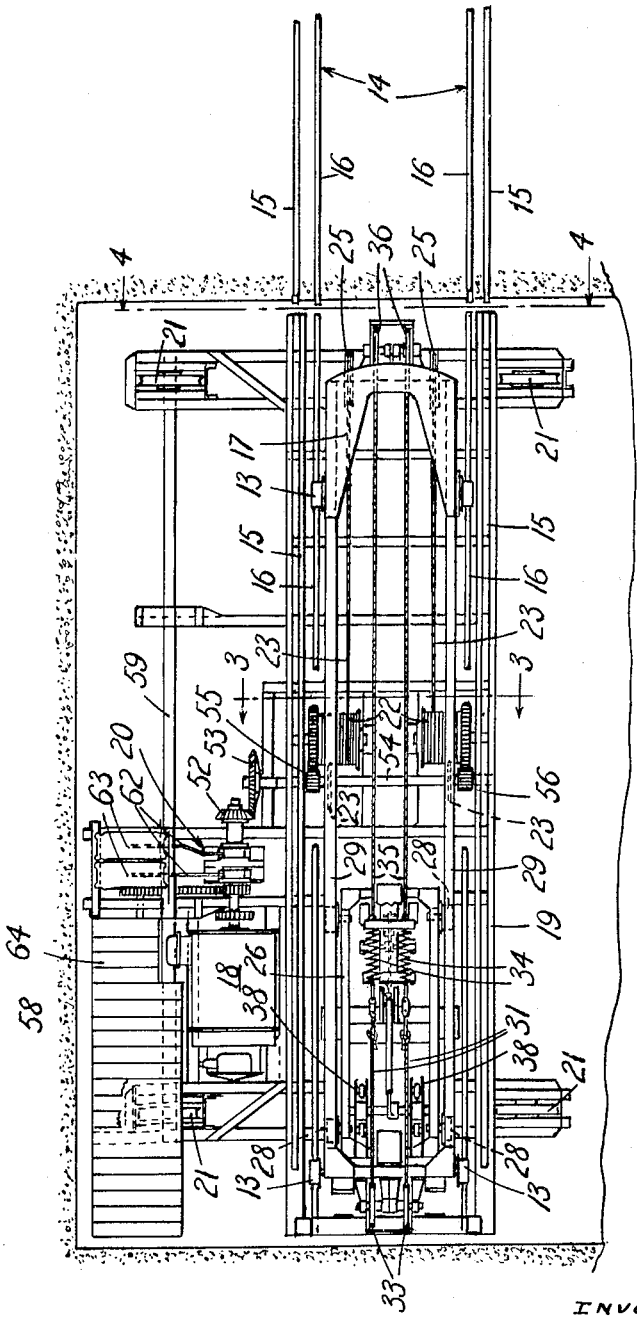
Figure 2 is a plan view of the traverser.
Figure 3:
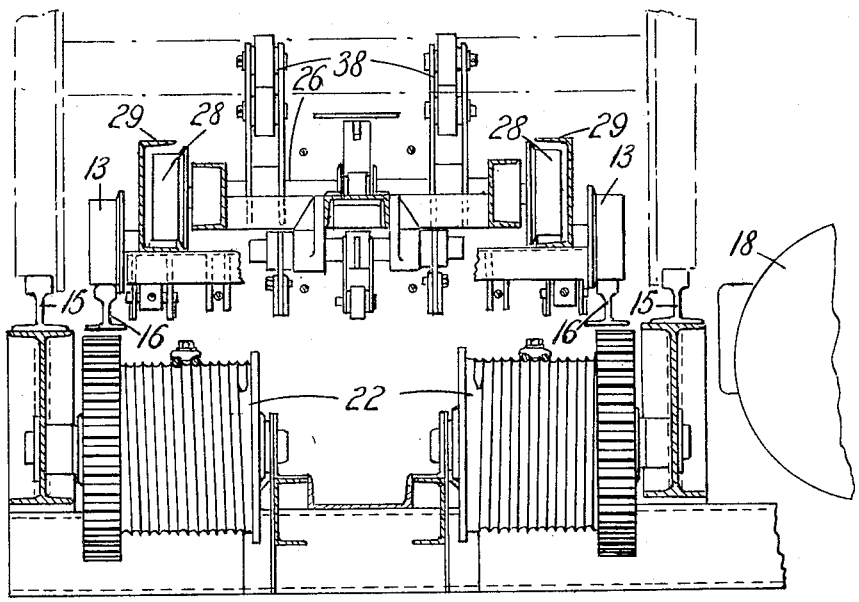
Figure 3 is a sectional view on the line 3—3 in Figure 2.
Figure 4:
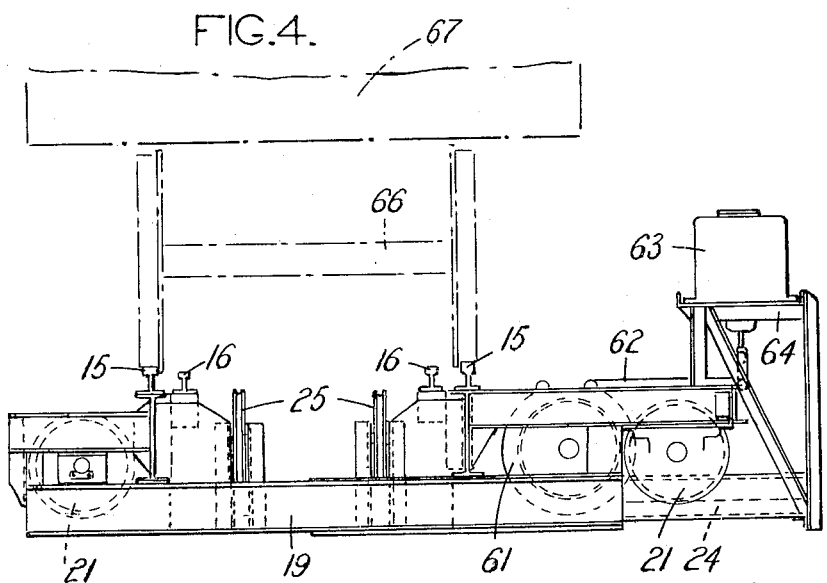
Figure 4 is an end view on the line 4—4 in Figure 2.

The traverser comprises a carriage 19 which is mounted on two pairs of flanged wheels 21 arranged for movement on rails 24 disposed at right angles to a plurality of parallel sidings. The rails of one of the sidings are shown at 14. The carriage is provided with two pairs of rails, one pair arranged centrally inside the other pair. Each siding also has inner rails for a short distance from the traverser end of the siding. The outer rails 15 are for wagons which are to be moved by the traverser, and the inner rails 16 guide and support the wheels 13 of the main trolley 17 of the traverser. The rails are so arranged that when the carriage 19 is moved to bring the rails thereon into alignment with the rails of a siding, a wagon on the outer pair of rails of that siding can be moved from the siding on to the carriage or vice versa. The inner rails 16 of each siding are long enough to accommodate the forward wheels 13 of the main trolley 17, when it is moved to extend on to the siding to the position of maximum outreach as shown by chain lines at the right hand side of Figure 1. An electric motor 18, housed on the carriage 19, can drive the carriage along its track, at right-angles to the sidings or, by means of a rope-drive, move the main trolley 17 over the carriage in a direction parallel to the sidings, according to the arrangement of a braking and epicyclic-gear mechanism, shown generally at 20 in Figures 1 and 2 and described later in greater detail with particular reference to Figure 5. The rope drive for the main trolley comprises, in duplicate, a drum 22 driven from the gear mechanism 20, a rope or cable 23 wound upon the drum 22, passed over sheaves 25, pivotally mounted on the carriage near to each end of the trolley rails 16 thereon, and secured at the free ends to an anchoring attachment 27 on the main trolley 17. A secondary trolley 26, which is much shorter than the main trolley, is supported on flanged wheels 28 guided for longitudinal movement in channel-shaped rails 29 carried by the main trolley 17. A rope drive for the secondary trolley comprises, in duplicate, a rope or cable 31 secured to an anchorage 32 on the carriage, passed over a sheave 33 pivotally mounted at one end of the main trolley and then secured to a tensioning spring 34 on the secondary trolley. At the other end of the spring 34 a rope or cable 35 is passed over a sheave 36 pivotally mounted at the other end of the main trolley and is then secured to the anchorage 32 on the trolley. An axle catch 38 and associated mechanism for handling wagons is mounted near to one end of the secondary trolley. The catch and associated mechanism will be described in detail later. When the main trolley is moved over the carriage, the secondary trolley will at the same time move automatically over the main trolley. The operation of the traverser will be described later.

*Driving mechanism*

The epicyclic gear mechanism 20 mounted on the carriage will now be described with particular reference to Figure 5. The mechanism comprises a main shaft 40 geared by gear wheels 39 and 41 to the spindle 44 of the electric motor 18, a sun pinion 42 mounted on the shaft 40 for rotation therewith and three planet pinions (of which one only is shown) 43 engaging the sun pinion 42. The planet pinions are supported on the spokes or webs 46 of a brake drum 47 which also carries a pinion 48, mounted axially on a sleeve 50 surrounding the main shaft, on the side of the brake drum nearer to the driving pinion. The pinion 48 transmits the traversing motion. The planet pinions engage a spur ring or annulus 51 of the same outside diameter as the brake-drum and which itself forms a second brake-drum, disposed axially alongside the first brake-drum. Secured to the second brake-drum there is a bevel pinion 52 mounted axially on a sleeve 49 surrounding the main shaft, on the side of the brake-drum remote from the driving pinion. The bevel pinion 52 is geared by a bevel gear wheel 53 to a shaft 54, itself connected by spur gears 55 and 56 to the rope-drums 22 of the main trolley 17. The pinion 48 which transmits the traversing motion is connected by a gear wheel 58 to a traverse shaft 59 on which one pair of the carriage wheels 21 are keyed. The two brake-drums are each engageable by post-brakes 61 operated by lever mechanisms 62 from solenoids 63 on the control platform 64 of the carriage. When the second brake-drum 51, geared as an annulus to the planet pinions 43, is braked, the driven main shaft 40 rotates the sun pinion 42, which in turn drives the planet pinions 43 and the first brake-drum 47, which is not braked. Therefore, the pinion 48 mounted on the first brake-drum is rotated, so providing the traversing motion for the carriage. To drive the rope-drums 22 for the main trolley, the first brake-drum 47 is braked and the second brake-drum freed; the bevel pinions 52 and 53 are then driven through the epicyclic gear train, so driving the rope-drums 22.

*Axle catch and associated mechanism*

The wagon axle engaging catch 38 pivotally mounted on the secondary trolley will now be described with particular reference to Figure 6. The height of a wagon axle may vary due to wear on the wheel tyres; but the catch is large enough to accommodate the axle in the various positions. Small rollers 72 mounted on the catch 38 receive the wagon axle. When the catch is turned about its pivot by a wagon axle, as will be explained later, the catch will be turned to a position as shown in Figure 6. The catch in turning will withdraw a connecting rod 68 from the top of a stop-pin 69. The stop-pin is connected at one end of a lever 71 pivotally mounted to the secondary trolley at 74. A balance weight 70 at the end of the lever 71 remote from the stop-pin 69 causes the stop-pin to be lifted from the position shown by chain-lines to the position shown by full lines in Figure 6. A rubber shock-absorber 75 mounted on the wagon axle engaging catch 38 limits the movement of the catch. An arm 82 pivoted to the lever 71 carries a roller 78 which is arranged to run on a cam-plate 80 of a tripper 77 (see Figures 1, 10, 11 and 12) located near the end of each discharge siding in the path of the trolleys. A spring 83 connected between the arm 82 and the lever 71 urges the arm and roller to the right as viewed in Figure 6. The lever 71 also carries two pawls 79 which are mounted thereto for idle pivoted movement when the trolleys are moved to the right as viewed in Figure 6, and to press against the lever 71 to rotate it in an anticlockwise direction, thereby withdrawing the stop-pin 69 from the end of the connecting rod 68, when the trolleys are moved to the left as viewed in Figure 6. The pawls 79 are arranged for engagement in ratchet grids 81 located on either side of the cam-plate 80 of the tripper 77. The ratchet grids 81 are staggered to ensure that when the pawls pass over the tripper to the left as viewed in Figure 6, one of the pawls will immediately engage one of the ratchet grids.

*Operation of traverser*

The operation of the traverser in handling a wagon 67 will now be described. The traverser carriage is moved by operating the solenoids 63 to brake the second brake-drum 51 and to free the first brake-drum, so rotating the pinion 48, until the rails on the carriage are in alignment with those of the siding on which the wagon 67 is situated. The solenoids 63 are then operated to engage the first brake-drum and to free the second brake-drum 51, so driving the rope-drums 22 and moving the main trolley 17 to extend on to the siding. At the same time, because the sheaves 33 and 36 for the secondary trolley ropes 31 and 35 move with the main trolley 17 and the anchorage 32 of the ropes is fixed to the carriage 19, the secondary trolley 26 will automatically move over the main trolley 17. The wagon axle engaging catch 38 on the secondary trolley is initially in a "release" position as shown in Figure 7, and engages an axle 66 of the wagon 67. On continued forward movement of the trolleys the catch 38 will turn towards the traverser, i. e. towards the left as viewed in Figure 6, and by withdrawing the connecting rod 68 the balance weight 70 will lift the stop-pin 69. The main trolley is then moved back on to the carriage to the position shown in full lines in Figure 1 and during this motion the secondary trolley will travel over the main trolley to its original position at the far end thereof, taking with it the wagon, over which it has full charge, during acceleration, travel and retard intervals. During this motion the catch will be in the position shown in Figure 8. The carriage will then move across the sidings, into alignment with a selected discharge siding and by means of trip switches (not shown) will come to rest where required. The main trolley 17 then moves over the carriage 19 again to the right as viewed in Figure 1, and at the same time the secondary trolley 26 moves automatically with the wagon 67 to the end of the main trolley now extending over the selected siding. The wagon axle engaging catch 38 during this operation is in the position shown in Figure 9. As the roller 78 reaches and rolls on the cam-plate 80 of the tripper 77, the arm 82 pivots in a clockwise direction as viewed in Figure 6 and the spring 83 will be elongated. The pawls 79 will run idly over the ratchet grids. The tripper 77 is so arranged that the roller does not travel completely over the cam-plate, when the main trolley is fully extended over the siding. This arrangment prevents any idle travel on the return stroke. After the main trolley has reached the fully-extended position it automatically begins to move back towards the carriage. However, immediately this return movement begins, one of the pawls 79 engages a ratchet grid 81 and the lever 71 is tripped, thereby pulling the stop-pin 69 downwards. The wagon axle is pressing against the wagon axle engaging catch 38 as shown in Figure 8 and immediately the stop-pin 69 is withdrawn from the end of the connecting rod 68, the axle catch will be turned by the axle to the "release" position, as shown in Figure 7. The wagon is now free from the wagon axle engaging catch, which will be moved away from the axle as the trolleys continue their movement back to the position shown in full lines in Figure 1. Immediately the lever 71 has been tripped, the spring 83 will pull the arm 82 and the roller 78 back, i. e. to the right as viewed in Figure 6. This movement will lift the pawls free from the ratchet grids, thus avoiding the pawls from rubbing against the remainder of the grids, causing unnecessary wear. When the trolleys have returned to their initial positions on the traverser carriage, the traverser is ready to repeat the traversing and wagon handling operation.

The traverser described above is arranged to return wagons to the same side of the carriage; but it is within the scope of the invention to provide a traverser which can discharge wagons to sidings on the far side of the carriage, from the reception sidings. To enable the traverser described to be used for the discharge of wagons to the opposite side of the carriage, the traverser herein described may be modified by mounting the anchorage 32 for the ropes 31 and 35 of the secondary trolley, on a screw extending across the carriage, i. e. parallel with the sidings. By turning the screw the anchorage can be moved from one side of the carriage to the other, and then by reversing the direction of motion of the rope-drums the trolleys may be moved to extend from the far side of the carriage.

A traverser according to the present invention can be used in a marshalling yard as described in British specification No. 628,500, or in conjunction with booster equipment as described in British Patent No. 550,529, dated July 7, 1941.

I claim:

1. A railway-wagon traverser of the type comprising a carriage traversable in a track arranged transversely of a set of substantially parallel railway sidings and travelling wagon-axle-engaging means locatable wholly within the width of the carriage and movable thereon relatively thereto in a direction parallel with the sidings into and out of a position outside the carriage width to engage a railway wagon and move it on to or off the traverser carriage, wherein the aforesaid travelling wagon-axle-engaging means comprises a main trolley bodily movable on the carriage in a direction parallel with the sidings, rails on the carriage arranged as a running track for the main trolley, companion rails on the sidings arranged to form extension tracks onto which the main trolley may be run, a secondary trolley which is mounted on the main trolley to partake of the aforesaid bodily movement of the latter and which is itself movable relatively to the main trolley in the same direction, rails on the structure of the main trolley arranged as a running track for the secondary trolley, and a wagon-axle-engaging catch on the auxiliary trolley.

2. A method of operating the railway-wagon traverser claimed in claim 1 which comprises the steps of moving the main trolley to extend partially over the siding on which the wagon to be handled is situated, simultaneously moving the secondary trolley outwardly, towards the sidings, from one end to the other of the main trolley into a position for the wagon-axle-engaging catch to engage the wagon, returning the main trolley onto the carriage, simultaneously moving the secondary trolley inwardly to the opposite end of the main trolley taking the wagon with it, traversing the carriage into a position in which the trolleys are in alignment with another siding, onto which the wagon is to be transferred, moving the trolleys to extend over the said other siding, and providing for disengagement of the wagon-axle-engaging catch from the wagon.

3. A railway wagon traverser as claimed in claim 1 in which the carriage and the main trolley are driven from a motor by an epicycle gear train arranged to provide either the traversing motion of the carriage or the longitudinal motion of the main trolley.

4. A railway-wagon traverser as claimed in claim 1 in which the wagon-axle-engaging catch comprises a plate having a forked profile, which plate is mounted on the secondary trolley for rotation in a vertical plane parallel to the direction of movement of the secondary trolley relative to the main trolley and is so arranged that an axle of a wagon to be moved may enter the forked portion of the profile of the plate and then, upon movement of the secondary trolley over the main trolley, automatically rotate the plate to a position in which the forked portion is upright, and mechanism for locking the plate in the upright position to secure the axle of the wagon.

5. A railway-wagon traverser as claimed in claim 1 in which the wagon-axle-engaging catch comprises a plate having a forked profile, which plate is mounted on the secondary trolley for rotation in a vertical plane parallel to the direction of movement of the secondary trolley relative to the main trolley and is so arranged that an axle of a wagon to be moved may enter the forked portion of the profile of the plate and then, upon movement of the secondary trolley over the main trolley, automatically rotate the plate to a position in which the forked portion is upright, mechanism for locking the plate in the upright position to secure the axle of the wagon, a catch releasing means constituted by a pawl device operatively connected to the aforesaid locking mechanism, combined with a ratchet grid engaging the pawl device and located at the traverser end of the siding to which the wagon is to be discharged.

6. A railway-traverser as claimed in claim 1 in which the secondary trolley comprises a plurality of components movable relatively to one another, in telescopic fashion, parallel with the sidings, the wagon-axle-engaging catch means being associated with the component capable of maximum extension in the direction of the sidings.

References Cited in the file of this patent

UNITED STATES PATENTS

| | | |
|---|---|---|
| 2,321,253 | Schellentrager | June 8, 1943 |
| 2,483,817 | Ehinger | Oct. 4, 1949 |
| 2,554,984 | Hegel | May 29, 1951 |